(12) United States Patent
Alisobhani et al.

(10) Patent No.: US 6,760,393 B1
(45) Date of Patent: Jul. 6, 2004

(54) SPREAD-SPECTRUM GMSK/M-ARY RADIO WITH OSCILLATOR FREQUENCY CORRECTION

(75) Inventors: Jalal Alisobhani, Crona Del Mar, CA (US); Donald K. Leimar, Rancho Palos Verdes, CA (US); Richard Kai-Tuen Woo, Orange, CA (US); Mark Philip Kaplan, Culver City, CA (US)

(73) Assignee: Navcom Technology, Inc., Redondo Beach, CA (US)

(*) Notice: Subject to any disclaimer, the term of this patent is extended or adjusted under 35 U.S.C. 154(b) by 0 days.

(21) Appl. No.: 09/564,683

(22) Filed: May 4, 2000

Related U.S. Application Data

(63) Continuation-in-part of application No. 09/522,393, filed on Mar. 9, 2000, now Pat. No. 6,430,212.
(60) Provisional application No. 60/132,882, filed on May 6, 1999.

(51) Int. Cl.[7] .................................................. H04L 7/00
(52) U.S. Cl. ..................... 375/365; 375/368; 375/376
(58) Field of Search .............................. 375/141, 145, 375/149, 354, 362, 364, 365, 367, 368, 375, 376; 370/324, 503, 510, 511, 513, 514, 515

(56) References Cited

U.S. PATENT DOCUMENTS

| | | | |
|---|---|---|---|
| 4,114,155 A | | 9/1978 | Raab |
| 4,538,281 A | | 8/1985 | Rajan |
| 4,598,413 A | * | 7/1986 | Szechenyi .................... 375/368 |
| 4,630,267 A | * | 12/1986 | Costes et al. ................ 370/324 |
| 5,327,455 A | | 7/1994 | De Gaudenzi et al. |
| 5,815,526 A | | 9/1998 | Rice |
| 5,920,591 A | | 7/1999 | Fukasawa et al. |

FOREIGN PATENT DOCUMENTS

WO  PCT/US00/12470  8/2000

* cited by examiner

*Primary Examiner*—Don N. Vo
(74) *Attorney, Agent, or Firm*—Morgan Lewis & Bockius LLP

(57) ABSTRACT

A communication device includes a transmitter and receiver. The transmitter includes an M-ary encoder configured to generate an M−1 number of distinctive symbols each comprising k bits. M is equal to 2k and k is a positive integer. The transmitter also includes a code generator configured to produce spread spectrum codeword sequences based on the symbols generated by the M-ary encoder and based on a first and a second Gold code polynomials. The transmitter sends a radio signal based on the spread spectrum codeword sequences. The receiver is configured to receive the radio signal. The receiver includes a first shift register configured to receive an input signal generated based on the received radio signal and a second shift register configured to receive and circularly shift a locally generated codeword sequence that is identical to the codeword sequence used to encode the symbols.

12 Claims, 10 Drawing Sheets

Order of bits written into interleaver:

SPREAD-SPECTRUM GMSK/M-ARY RADIO WITH OSCILLATOR FREQUENCY CORRECTION

CROSS-REFERENCE TO RELATED APPLICATIONS

This is a Continuation-In-Part Application of Ser. No. 09/522,393 filed on Mar. 9, 2000, which is now U.S. Pat. No. 6,430,212 B1. This application also claims the benefit of U.S. Provisional Application No. 60/132,882 filed May 6, 1999. Both of the above-identified applications are incorporated herein by reference in their entirety.

FIELD OF THE INVENTION

This invention relates to spread-spectrum communications systems that utilize Gold-code sequence generator in combination with an M-ary encoding scheme.

BACKGROUND OF THE RELEVANT ART

A conventional mobile communication system comprises communication networks each of which includes a base station and a number of mobile radios that communicate with the base station. In such a communication system, a communication signal from one mobile radio should not interfere with communication signals from other mobile radios within a network, and communication signals from one network should be free of interference from communication signals of other networks. Conventionally, a Time Division Multiple Access (TDMA) scheme is utilized to separate one mobile radio signal from other radio signals within a network. Further, different networks may then separate themselves from each other by using a Frequency Division Multiple Access (FDMA) scheme.

When a communication network uses the TDMA method, it is desirable for receivers in the mobile radios to synchronize to a signal transmitted from the base station quickly since the time expended for synchronization is time that cannot be used for communication. Thus, non-coherent modulation techniques are preferable since they do not require additional time to synchronize, and since they are more tolerant of Rayleigh-fading channels. However, non-coherent modulation schemes are more susceptible to interference than coherent modulation schemes. M-ary signaling is one non-coherent modulation scheme that minimizes the susceptibility to interference. For example, 64-ary orthogonal signaling is used in the IS-95 CDMA cellular system. One weakness with this form of modulation is that the orthogonality among signals is lost when the signals are transmitted through a multipath channel, since the delayed component of the signal is identical to another signal.

With respect to FDMA, as the number of networks increases within a given geophysical area, the degree of separation achieved with the FDMA scheme is reduced. This results in one network interfering with the networks that use adjacent frequency signals. This interference is most detrimental when a radio causing the interference is closer to a base station than a mobile radio that actually belongs to the base station's network. This phenomenon is called the "near-far" interference problem. This problem is somewhat mitigated by confining the frequency spectrum of the communication signals for each network. Gaussian-filtered, Minimum Shift Keyed (GMSK) modulation is one method of containing the spectral characteristics of the communication signals. However, this approach does not entirely solve the near-far interference problem.

Therefore it is desirable to provide a mobile communication system that allows multiple communication networks to operate within the same physical area with little or no interference among the communication signals from different networks and among different mobile radios within one network.

SUMMARY OF THE INVENTION

The present invention allows a wireless communication system to maximize the number of co-existing networks within a frequency band while achieving a large far-near ratio, and while using inexpensive class-C transmitters. This is achieved in part by using spreading codes that retain their near-orthogonality when transmitted through multipath channels.

Morever, the present invention permits a plurality of radios to access the network by time-sharing the transmission channel in such a manner that a receiver can synchronize to each transmission with a minimum of time, which in turn allows simultaneous communication of voice and data information.

The present invention also allows multiple private conversations between mobile radios while a plurality of the mobile radios receive broadcast data.

More specifically, the present invention provides a communication device that includes a transmitter and receiver. The transmitter includes an M-ary encoder configured to generate an M−1 number of distinctive symbols, each comprising k bits. M is equal to $2^k$ and k is a positive integer. The transmitter also includes a code generator configured to produce spread spectrum codeword sequences based on the symbols generated by the M-ary encoder and based on first and second Gold code polynomials. The transmitter is configured to send a radio signal based on the spread spectrum codeword sequences. The receiver is configured to receive the radio signal. The receiver includes a first shift register configured to receive an input signal generated based on the received radio signal and a second shift register configured to receive and circularly shift a locally generated codeword sequence, identical to codeword sequence used to encode symbols. The receiver also includes an accumulator coupled to the first and second shift registers and configured to multiply and accumulate stored values in the first and second shift registers each time the second shift register is circularly shifted and a selecting device coupled to the accumulator and configured to identify one symbol from the plurality of symbols based on outputs from the accumulator. A method corresponding to the above described communication device is also provided.

In another aspect of the present invention, the base station and its mobile radios share the carrier frequency assignment by dividing transmission time into segments called time-slots. The time-slots are organized into frames such that mobile units and the base station can be assigned one or more time-slots within a frame, during which time they may transmit their modulated signal as a message segment. Each time-slot assignment can be used to convey voice or data information.

The intended recipient, or recipients, for each message segment are identified within each message segment by its "destination address." This enables the base station to broadcast messages to a plurality of mobile units while several mobile-base-mobile transmissions occur. Each mobile-base-mobile communication consists of the mobile unit transmitting a message segment to the base station, which then re-transmits the message segment to another mobile unit.

When appropriate, the re-transmission from the base station may be addressed to a plurality of mobile units. Message segments may contain either voice or data information.

Time-slots may also be assigned to a plurality of mobile units for infrequent transmissions. In this case, the mobile units share the assignment using a slotted-ALOHA protocol. If two mobile units transmit simultaneously, their signals will not be correctly received and both units retransmit the message segments after a random delay if they are not acknowledged by the base station.

The base station and mobile units demodulate the spread-spectrum message segments by first synchronizing the receiver's time reference to a preamble spreading code. Using the synchronized time reference, the receiver demodulates M-ary symbols by finding the one-of-M spreading sequence which correlates best with the received signal. The M-ary symbols are then decoded into binary data conveying either voice or data information. The present invention includes a simplified method of finding the sequence with highest correlation.

Furthermore, the mobile radios of the present invention can transmit and receive digitized voice data or Internet communication packets. In other words, when a computer is connected, the mobile radio of the present invention can send and receive messages to and from the Internet. This capability is in addition to operating as a regular mobile telephone.

In addition, mobile radios, which are capable of synchronizing the frequency of their respective oscillators to their respective base-stations to reduce the likelihood of introducing demodulation errors in both the base-to-mobile and mobile-to-base communication links, are also discussed.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

Figure 1:
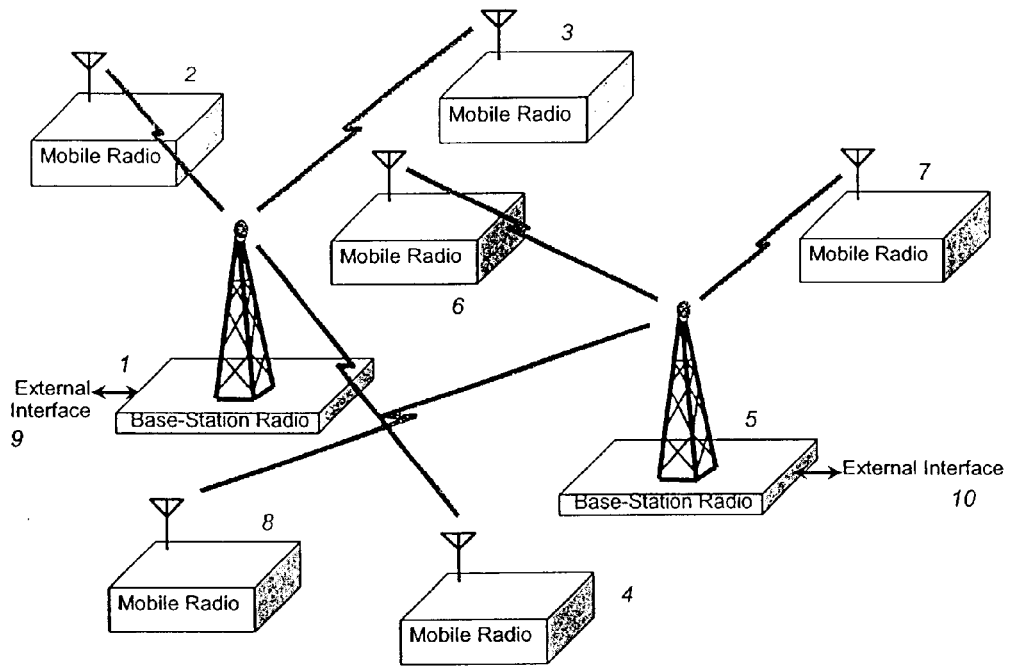
FIG. 1 is an exemplary illustration of two networks operating in the same geophysical area.

An exemplary communication system of the present invention includes a number of communication networks, two of which are illustrated in FIG. 1. A first network includes a base station 1 and mobile radios 2, 3, and 4. A second network comprises a base station 5 and mobile radios 6, 7, and 8. The two networks are preferably interconnected through external interfaces 9 and 10, such as the Public Switched Telephone Network (PSTN) or a direct wired connection. The external interfaces also connect the networks to other data and voice communication systems including the Internet. Within each network, the mobile radios may communicate with the base station, or with other mobile radios belonging to the same network by establishing communication links to the respective base station. For instance, once the communication links are established, a mobile radio communicates with other mobile radios of its network by transmitting to the base station, which then relays the transmission to the receiving mobile radio, or radios. Each mobile radio and base station includes a transmitter and a receiver. The transmitter and receiver in each mobile radio or base station can be also combined into a transceiver.

Figure 2:
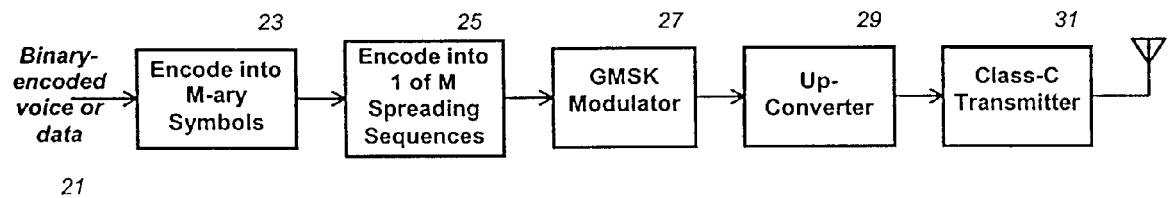
FIG. 2 is a block diagram shows the operations to modulate and transmit a stream of binary-encoded information using the GMSK/M-ary spread-spectrum method.

Referring to FIG. 2, a transmitter of the present invention includes an M-ary encoder 23, a spread spectrum encoder 25, a Gaussian minimum shift keying (GMSK) modulator 27, an up-converter 29 and a class-C transmitter 31.

The M-ary encoder 23 receives binary encoded data or voice bit stream 21 as input. The input data are then encoded into k-bit waveform symbols. In other words, the input data signal is encoded into $M=2^k$ distinctive symbols. In the present invention, k is preferably equal to 6 and M is preferably equal to 64. It follows that output data of the M-ary encoder in the present invention are 6-bit symbols that are input to the spread spectrum encoder 25. In alternative embodiments, the M-ary encoder can also be a 32ary, 128-ary or any other M-ary encoder available to one of ordinary skill in the art.

The spread spectrum encoder 25 preferably includes a Gold-code sequence generator. A general description of Gold codes is provided in "Optimal Binary Sequences for Spread Spectrum Multiplexing", Robert Gold, *IEEE Trans. Info. Theory*, October, 1967, pp 619–621, which is incorporated herein by reference. Gold-code sequences have the property of uniformly low cross-correlation between any two sequences having any time offset. This characteristic of Gold-code sequences can be harnessed to retain near-orthogonal signal sets as they propagate through multipath channels.

For instance, when the length of Gold-code sequence is 6, i.e., M=64, Gold-code's maximum cross-correlation between any two sequences having any time offset is calculated to be 17/63. This is significantly lower than the maximum cross-correlation between two orthogonal sequences that are offset in time, which is ½. The lower cross-correlation (i.e., lower interference among code sequences) minimizes the probability that a time-delayed signal, due to multipath propagation, is incorrectly decoded.

Consequently, the use of Gold-code generator 49 to form a set of M codeword sequences can provide more reliable communications through a multipath channel. Furthermore, two different networks sharing the same frequency band can use different sets of Gold-code sequences to minimize the interference between the networks.

Figure 3:
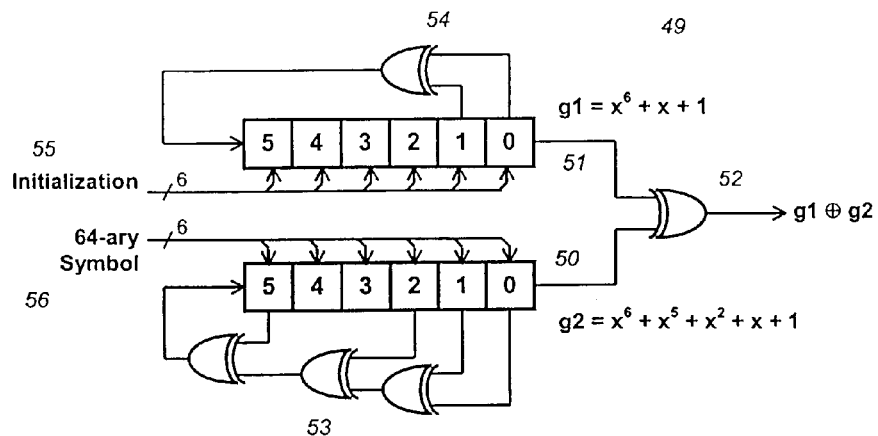
FIG. 3 shows a Gold-code sequence generator.

FIG. 3 illustrates an exemplary Gold-code sequence generator 49 for M=64, which includes at least two sets of shift registers 50, 51 and an exclusive-OR gate 52 receiving outputs from the shift registers 50, 51. Each shift register is composed of a number of stages (e.g., 6) and includes a feedback arrangement 53, 54 which comprises one or more exclusive-OR gates for each set of the shift registers 50, 51.

In operation, the M-ary symbols (i.e., 64-ary symbol 56) from the encoder 23 are loaded into the k-stage shift register 50 at the beginning of each symbol interval. The shift registers 50 and 51 are clocked M−1 times to generate maximal-length sequences. As the shift registers are clocked, outputs of certain stages are fed back through the respective feedback arrangements 53, 54. When the all-zeroes symbol (i.e., initialization 55) is loaded into register 50, the output sequence is a set of M−1 zeroes. The two maximal-length sequences generated by the shift registers 50, 51 are input to the exclusive-OR 52 to generate a Gold sequence as output.

During the synchronization preamble, the shift register 51 is loaded with all-zeroes symbol (i.e., initialization 55) and register 50 is loaded with a non-zero symbol, preferably all-ones. The resulting sequence is thus unique to synchronization to protect against mistaking the preamble for data.

The feedback arrangements, configured to generate the pair of maximal-length sequences, are constructed in accordance with polynomials g1=$x^6$+x+1 and g2=$x^6$+$x^5$+$x^2$+x+1. For M=64, there are six pairs of maximal-length sequences that produce Gold-code sequences when exclusive-OR'd together. Different networks within a common geophysical area may use different sets of Gold-code polynomials to further minimize interference among networks. The polynomial pairs to construct the six different Gold-code sequences to be used by six different networks for M=64 are as follows:

| g1 Polynomial | g2 Polynomial |
| --- | --- |
| $x^6$ + x + 1 | $x^6$ + $x^5$ + $x^2$ + x + 1 |
| $x^6$ + $x^5$ + $x^2$ + x + 1 | $x^6$ + $x^5$ + $x^3$ + $x^2$ + 1 |
| $x^6$ + $x^5$ + $x^3$ + $x^2$ + 1 | $x^6$ + $x^5$ + 1 |
| $x^6$ + $x^5$ + 1 | $x^6$ + $x^5$ + $x^4$ + x + 1 |
| $x^6$ + $x^5$ + $x^4$ + x + 1 | $x^6$ + $x^4$ + $x^3$ + x + 1 |
| $x^6$ + $x^4$ + $x^3$ + x + 1 | $x^6$ + x + 1 |

The various embodiments of feedback arrangements 53,54 in accordance with the g1 and g2 polynomials in the above table are illustrated in FIGS. 3, 3A, 3B, 3C, 3D and 3E.

In alterative embodiments, as discussed above in connection with the M-ary encoder, when 32-ary, 128-ary or other M-ary encoders are utilized, the Gold-code sequence generator and its polynomials are changed appropriately in accordance with what is known in the art.

Figure 4:
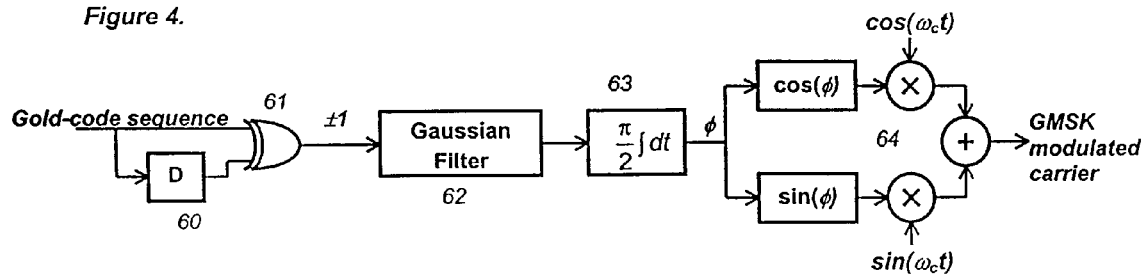
FIG. 4 shows a preferred embodiment of GMSK modulation with 64-ary Gold-code sequences.
Figure 3A:
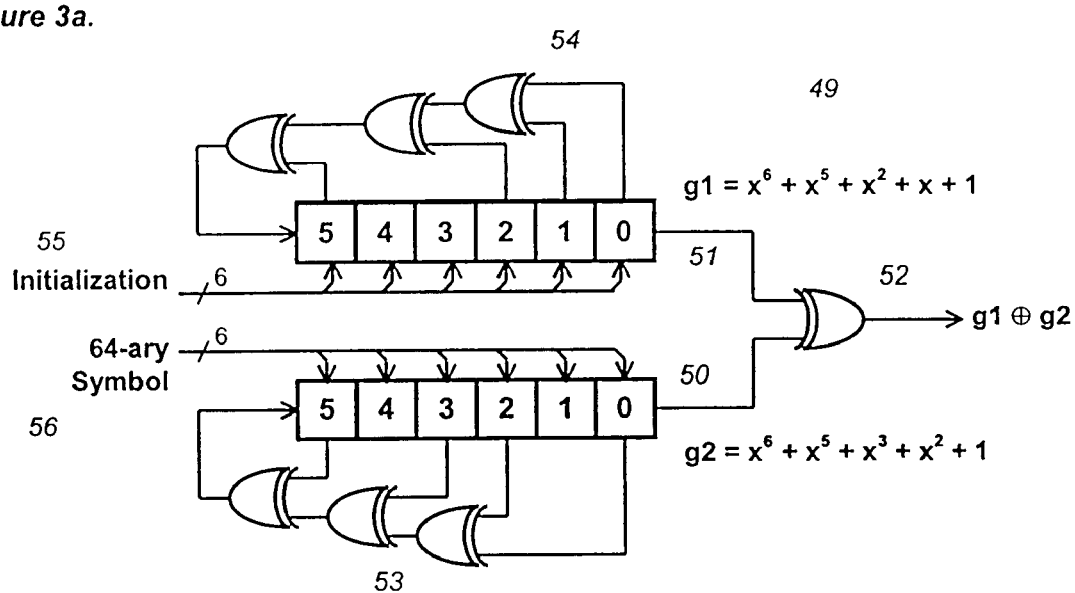
FIGS. 3A, 3B, 3C, 3D and 3E illustrate various embodiments of the Gold-code sequence generator.
Figure 3B:
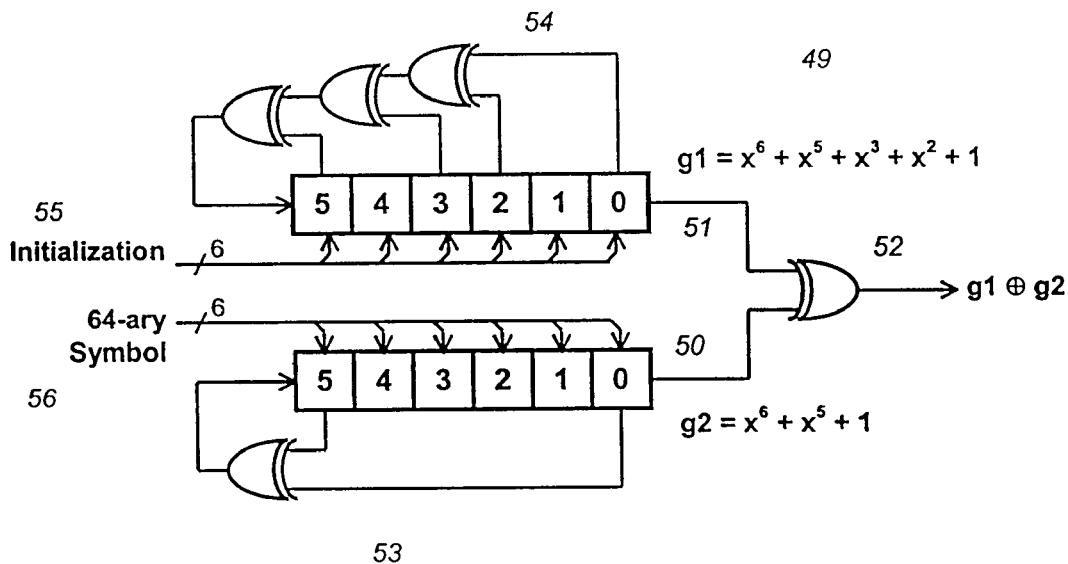
Figure 3C:
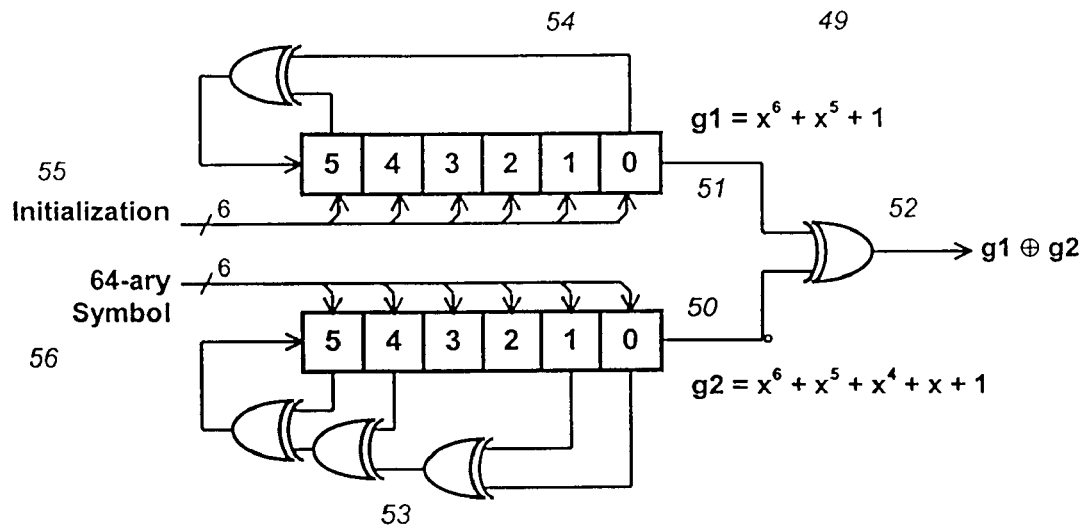
Figure 3D:
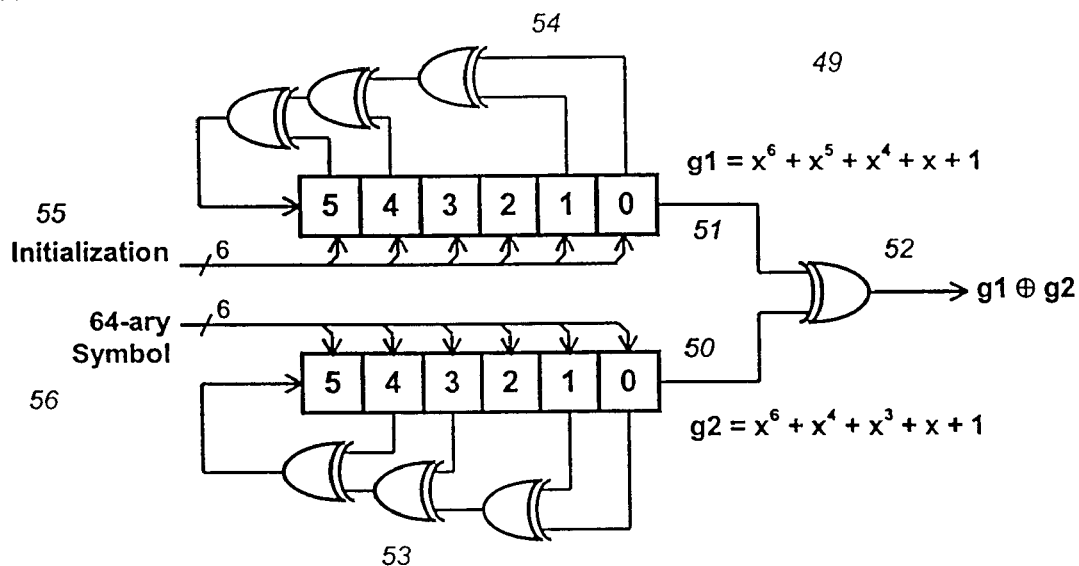
Figure 3E:
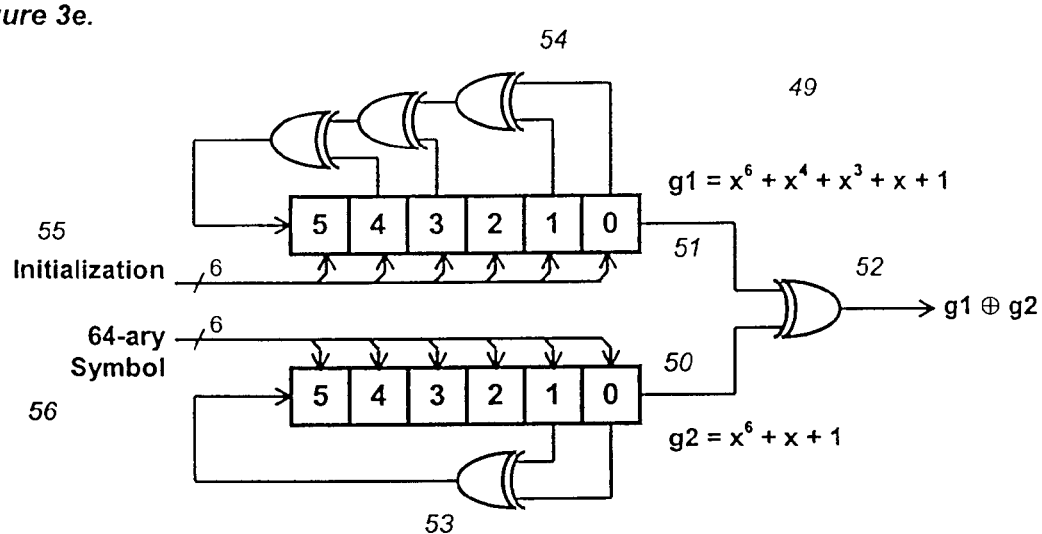

Now referring to FIG. 4, the code sequences from the Gold cold sequence 49 are pre-coded with a one-chip delay element 60 and an exclusive-OR 61. The output of the exclusive-OR 61 undergoes GMSK modulation. In particular, the output of the exclusive OR 61 is filtered by a low-pass filter 62 having an impulse response of $$h(t) = \frac{1}{2T}\left[ erf\left(\sqrt{2}\pi B\frac{t+T/2}{\sqrt{\ln 2}}\right) - erf\left(\sqrt{2}\pi B\frac{t-T/2}{\sqrt{\ln 2}}\right)\right] \quad \text{Eqn. (1)}$$

where B is the bandwidth of the lowpass filter 62 having a Gaussian shape and T is the chip interval of the code sequence. The impulse response of the filter 62 is preferably a finite impulse response (FIR) clocked at a multiple of the chip rate. The filter output is integrated by an integrator 63 to yield modulation angles. In turn, a modulator 64 quadrature phase modulates an RF carrier based on the modulation angles.

The following discussion shows that the modulation pre-coding, 60 and 61, preserves the characteristics of code sequence after the GMSK modulation discussed above. First, consider MSK modulation with a code sequence, $P_k$, having values of ±1. The phase sequence can be written as $$\phi_k = \phi_{k-1} + \frac{\pi}{2}p_k \quad \text{Eqn. (2)}$$

and the modulated signal can be written as $$s(kT) = e^{j\phi_k} = e^{j\phi_{k-1}}e^{j\frac{\pi}{2}p_k} = jp_k e^{j\phi_{k-1}} \quad \text{Eqn. (3)}$$

Moreover, s(kT) can be written as $$s(kT) = e^{j\phi_0}\prod_{i=1}^{k} jp_i \quad \text{Eqn. (4)}$$

for integer values of k>0. For uniformly low cross-correlation, sequence $P_k$ is constructed such that $$g(k) = \prod_{i=1}^{k} p_i \quad \text{Eqn. (5)}$$

is a Gold-code sequence, and the received signal is correlated with the complex conjugate of s(kT), or $$s(kT)^* = e^{-j\phi_0}\prod_{i=1}^{k}(-jp_i) = (-j)^k g(k)e^{-j\phi_0} \quad \text{Eqn. (6)}$$

If g(k) is passed through the modulation pre-coding of 60 and 61, the resulting sequence is $$p_k = g(k) \times g(k-1), \quad \text{Eqn.(7)}$$

with g(0)=1. Substituting this $P_k$ sequence into the above condition results in $$g(k) = g(k)\prod_{i=1}^{k-1} g^2(i) = g(k) \quad \text{Eqn. (8)}$$

for all integer values of k>0.

Now consider GMSK modulation. For GMSK, the pre-coded sequence $P_k$ is filtered with impulse response h(t), and truncated to finite length LT, to produce the modulation phase sequence $$\phi_k = \phi_{k-1} + \frac{\pi}{2} \sum_{n=k-L/2}^{k+L/2} p_n h(kT - nT) \quad \text{Eqn. (9)}$$

$$= \phi_0 + \frac{\pi}{2} \sum_{i=1}^{k} \sum_{n=i-L/2}^{i+L/2} p_n h(iT - nT)$$

$$= \phi_0 + \frac{\pi}{2} \sum_{n=-L/2}^{L/2} \left( h(nT) \sum_{i=1}^{k} p_{i-n} \right).$$

The matched-filter correlation is with $e^{-j\phi^k}$. Filtering the spreading sequence before modulation disperses each chip over a time interval greater than the chip duration of T. Consequently, correlating with a simpler signal such as $s(kT)^*$, as defined for MSK, results in a correlation loss. However, the pre-coding, 61 and 62, preserves the Gold-code cross-correlation characteristics so that the correlation of the received signal with $s(kT)^*$(see, Eqn. 6) is not significantly impaired by time offsets created by the filter 62.

Figure 5:
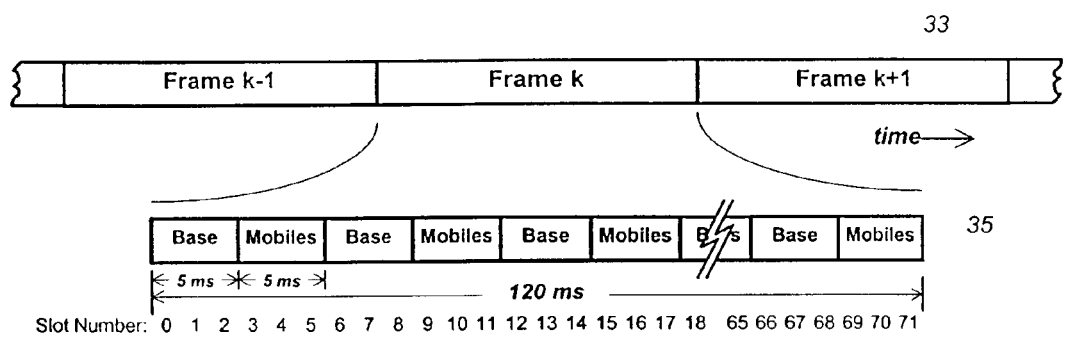
FIG. 5 shows the division of time into frames and time-slot assignments.

The GMSK modulated carrier signal is then up-converted and transmitted by the transmitter, which is preferably a class-C transmitter 31, over a communication link. The communication link between the base station and its mobile radios is time-division multiple accessed (TDMA). The structure of TDMA, shown in FIG. 5, includes a continuous stream of frames 33. In turn, each frame includes a number of slots 35. More specifically, each 120-millisecond TDMA frame is divided into 72 time slots. In particular, the base station always transmits during three consecutive slots and every other three slots of the frame.

More specifically, the base station transmits during slots 0, 1, 2, 6, 7, 8, . . . 66, 67, and 68. The base station assigns the remaining slots as either "reserved slots" or "ALOHA slots" for its mobile radios to transmit radio signals. The reserved slots are assigned for use by a specific mobile radio only. The ALOHA slots are available for any mobile radio to use. The ALOHA transmissions are always one slot long; however, transmissions in reserved slots may be either one, two, or three slots long. Each transmission burst, whether one, two, or three slots long, begins with a synchronization preamble and ends with a guard interval. The synchronization preamble allows the receiver to determine the correct time-alignment of the transmitter's spreading sequence. A unique word follows the synchronization preamble to signify the start of data, which follows the unique-word pattern.

Figure 6:
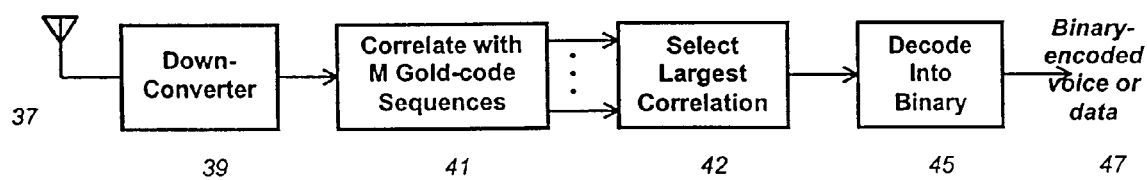
FIG. 6 shows the operations to synchronize and demodulate the received GMSK/M-ary spread-spectrum signal into binary information.

The data segment varies in length depending upon the number of slots being used. Referring to FIG. 6, a preferred embodiment of a receiver of the present invention includes an antenna 37, a down-converter 39, a Gold code correlator 41, magnitude selection circuitry 43 and an M-ary decoder 45.

The antenna 37 and down-converter 39 are implemented by using standard components and devices known in the art in order to receive the transmitted signal and to translate the received signal to baseband signals, respectively.

Figure 7:
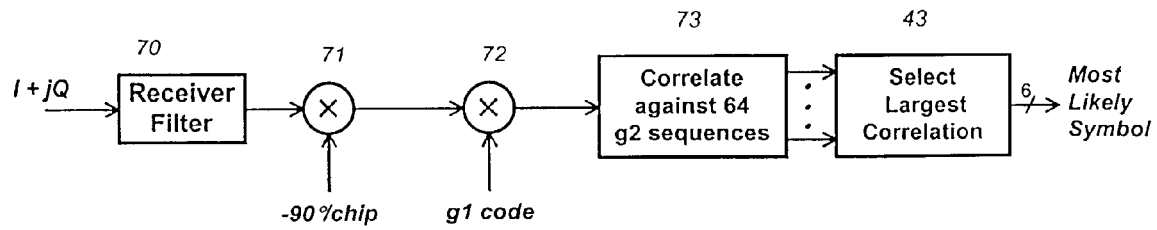
FIG. 7 shows a preferred embodiment of GMSK demodulation of 64-ary Gold-code sequences.

The Gold code correlator 41 uses the property that the Gold-code sequence is the product of two maximal-length sequences. In particular, referring to FIG. 7, the Gold-code correlator 41 includes a receiver filter 70, a pair of mixers 71, 72 in series and a circular correlator 73.

The receiver filter 70 rejects out-of-band noise and interference while passing the GMSK signal. The mixer 71 removes the $(-j)^k$ sequence, or 90°/chip frequency offset produced by the MSK modulation. Further, the mixer 72 removes the g1 sequence, one of the two maximal-length sequences, during demodulation. The circular correlator 73 is therefore simplified to compute the correlation against the M−1 different shifts of a single maximal-length code sequence and the all-zero sequence.

In particular, the correlator 73 preferably determines when the time that each 63-chip sequence starts by using the synchronization preamble, transmitted at the beginning of each transmission burst. The synchronization preamble includes the all-zero g1 sequence and the g2 generator is initialized to a predetermined non-zero value, preferably all-ones. As a result, the largest g2-sequence correlation magnitude indicates the most likely time-of-arrival of the received signal. The correlation magnitudes are averaged with an exponentially-decaying filter over several 63-chip intervals before deciding the most likely time-of-arrival.

When the data segment is transmitted, g1⊕g2 is received. During this mode, the received signal is correlated with the g1 sequence by the mixer 72. Subsequently, the circular correlator 73 correlates the residual signal with M−1 different shifts of the g2 sequence and the all-zero sequence. The magnitudes of the M correlator outputs are compared by the magnitude-selection circuitry 43 to determine the most likely M-ary symbol that was transmitted.

Figure 8:
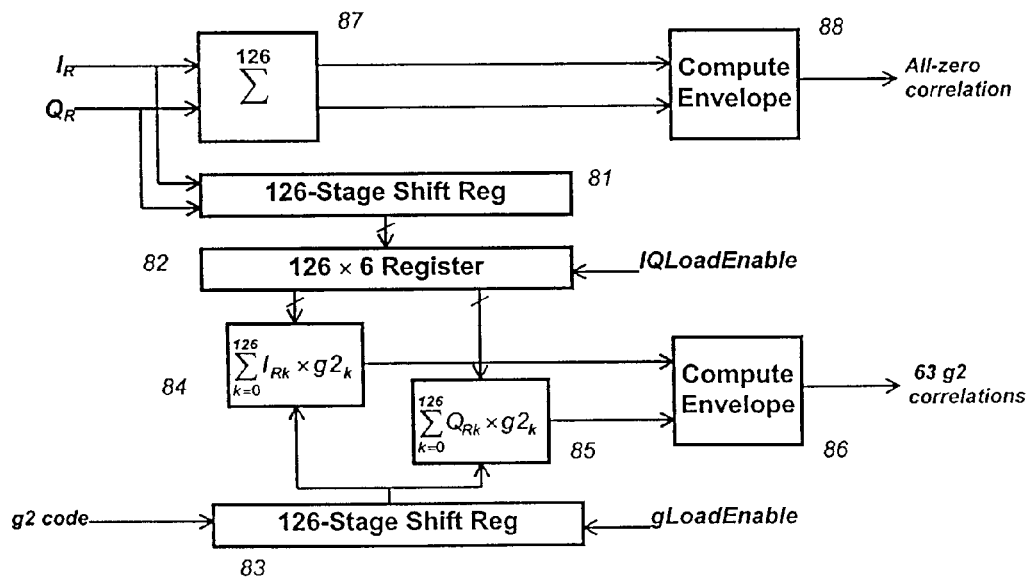
FIG. 8 shows a preferred embodiment of a g1/g2-code correlator.

Now referring to FIG. 8, the circular correlator 73 includes an accumulator 87 and a serial input shift register 81 having 2(M−1) number of stages (e.g., when M=64, there are 126 stages) configured to serially receive an output signal from the mixer 72. The correlator 73 also includes a parallel input shift register 82 having 2(M−1) by k number of stages (e.g., 126 by 6) configured to receive in parallel the 2(M−1) bits of input data from the serial input shift register 81. The correlator 73 further includes a g2-code shift register 83 having 2(M−1) number of stages. Moreover, a pair of accumulators 84, 85 are provided to correlate the 2(M−1) bits of data in the parallel input shift register 82 with the 2(M−1) bits of data in the g2-code shift register 83.

In operation, the output signal from mixer 72, represented by $I_R + jQ_R$, is sampled an integer number of times per chip interval. The signal from the mixer 72 is preferably sampled twice per chip, or 126 times per GMSK symbol interval. As discussed above, the correlator 73 operates in two different modes: synchronization and demodulation. The correlator 73 operated in the synchronization mode to correctly align locally generated g1 and g2 code sequences to the received signal. After the locally generated code sequences are aligned in time to the received signal, the correlator 73 operates in the demodulation mode to find the most likely sequence of M-ary symbols that is being received.

In particular, during the synchronization mode, the incoming $I_R + jQ_R$ signal is shifted into the register 81 at each sampling instant. The register 82 is enabled, via IQLoad-Enable signal, to load the shifted signals at each sampling instant to be correlated against the g2 code that has been loaded into register 83. The accumulators, multiply-and-add circuits, 84 and 85 compute the complex correlation at each sampling instant. Subsequently, envelope computation 86 yields a real-valued correlation at each instant by taking, or approximating, the square root of a squared real term added to a squared imaginary term. This process is performed for at least 63 chip intervals, and the sampling instant for which the real-valued correlation is maximized indicates the end, or time alignment, of the g1 and g2 codes.

During the demodulation mode, the incoming $I_R + jQ_R$ signal is also shifted into register 81 at each sampling instant. However, the register 82 is only loaded at the end of each g2 code sequence. The incoming signal is also accumulated in 87 for the duration of the g2 code interval. At the end of the g2 sequence, the envelope of the accumulation is computed by 88. The envelope value is calculated by taking, or approximating, the square root of a squared real term added to a squared imaginary term. This envelope is the correlation with the all-zero, g2 sequence. After loading register 82 and while the next symbol sequence is being collected by register 81, the g2 code sequence is circularly shifted in register 83. For each shift, a real-valued correlation is computed by 84, 85, and 86. Every other correlation yields sixty-three values. In one embodiment, using the magnitude selection circuitry 43, the largest of these output values, 86, and the output of 88 is identified as the most likely g2 code sequence that was transmitted.

The most likely 64-ary symbol can be represented by 6 bits, corresponding to the modulator input at the transmitter. The likelihood of each of the 6 bits is required to decode the convolutionally-encoded user-data bit stream using a maximum likelihood decoder as described in the article "Convolutional Codes and Their Performance in Communications Systems", A. J. Viterbi, *IEEE Transactions on Communications Technology*, October 1971, pp 751–771, which is incorporated herein by reference. The largest envelope can convey this likelihood information for all six bits, also called soft decisions, as described in the article "Performance of Power-Controlled Wideband Terrestrial Digital Communication", A. J. Viterbi, A. M. Viterbi, and E. Zehavi, *IEEE Transactions on Communications Technology*, April 1993, pp. 559–568, which is incorporated herein by reference. However, it is preferable to convey only the largest envelope corresponding to each of the six bits.

Figure 9:
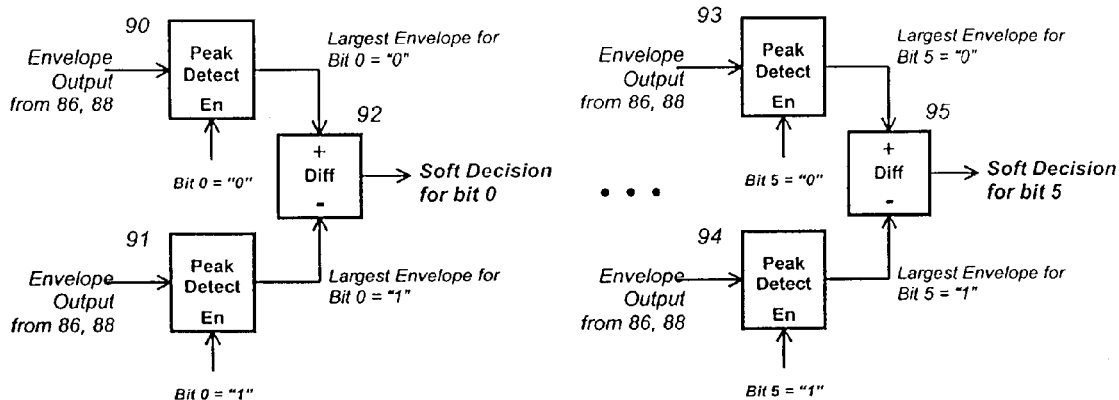
FIG. 9 shows a preferred method of calculating soft decisions.

FIG. 9 shows the preferred embodiment of formulating six soft decisions for the 64-ary demodulator output. Each of the 64 codeword symbol can be uniquely numbered by a six-bit number; i.e. bits "0" through "5". Thirty-two of the codewords are numbered such that bit "0" is zero valued, and the remaining thirty-two codewords have bit "0" equal to "1". For each codeword symbol, envelope computation 86 or 88 sequentially computes the envelope. These envelope values are applied to peak detectors 90 and 91. The peak detector 90 identifies the largest envelope of the thirty-two codewords with bit "0" equal to "0", and the peak detector 91 identifies the largest envelope of the thirty-two codewords with bit "0" equal to "1". After comparing the envelopes of all 64 codewords, a difference calculator 92 calculates the difference of the identified peak envelopes. This difference is used as the soft decision for bit "0", with the magnitude of the difference conveying the relative likelihood of the correct bit decision being "0" instead of "1". Similar processing is performed to calculate soft decisions for bits "1" through "5".

The above described transmitter and receiver characteristics are incorporated into a preferred embodiment of a transceiver of the present invention. Both base stations and mobile radios can include the functional components shown in FIG. 10. The antenna 100 is used to collect electromagnetic radiation for reception and launch electromagnetic radiation for transmission. The transmitter-receiver (T-R) switch 101 directs the signal flow for transmission and reception. The receiver down-converter 102 translates the received radio-frequency signals to baseband in-phase (I) and quadrature-phase (Q) signals. Either a bandpass filter at an intermediate frequency or lowpass filters at baseband restrict the bandwidth of the received signals. The I and Q signal components are demodulated into soft decisions that are deinterleaved and used to decode the digital data messages.

Demodulation is performed by first synchronizing 103 the receiver timing to the incoming signal, and then correlating 104 the incoming signal with the M Gold-code sequences.

The data processor 108 parses the digital messages, and either stores the received data for later transmission, outputs the data to the external interface, or uses the data for internal processing. During transmission, the data processor 108 outputs digital data messages to the radio. The radio encodes and interleaves the data for error correction prior to Gold-code encoding 10b and GMSK modulation 10c. The GMSK signal is then up-converted 10d to the RF carrier for amplification. The transmitter power is controlled by the data processor to assure link quality while minimizing interference to other networks. The amplified carrier is then conducted through the T-R switch 101 to be radiated by the antenna 100.

Links from Base Station to Mobile Radio

As discussed above in connection with FIG. 5, the base station uses three consecutive time slots every other three slots of a frame for transmission. Each slot duration is 5/3 milliseconds which contains 96 symbols at the symbol rate of 57,600 baud. Each base-to-mobile transmission starts with a 32symbol synchronization preamble which is followed by an 8-symbol unique word. Following the unique word, 232 symbols of user data, which includes addressing, cyclic redundancy check (CRC) coding, and at least two symbols of forward error correction (FEC) flush. A 16-symbol guard interval, during which no data is transmitted, follows the user data. The user-data segment is rate-½, convolutionally encoded, and each 64-ary symbol encodes 6 bits. Consequently, 232×6/2=696 bits of addressing, information, CRC, and flush information are encoded in each user segment.

A preferred embodiment of the convolutional encoder uses the industry-standard code generators $G_0=171_8$ and $G_1=133_8$ for constraint length k=7. Further details of convolutional encoding and decoding are found in *Error-Correction Coding for Digital Communications*, George C. Clark and J. Bibb Cain, pp 227–235, Plenum Press, 1981, which is incorporated herein by reference.

Figure 11:
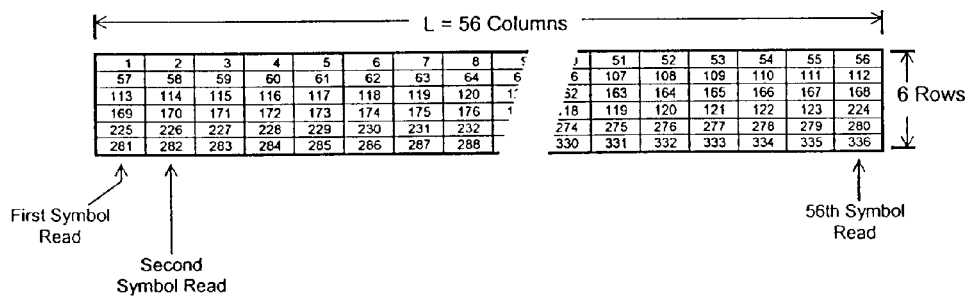
FIG. 11 shows the sequential order that bits are written into the interleaver; and the sequential order that 6-bit symbols are read from the interleaver.

The convolutional encoder generates 1392 bits for each three time slot transmission. The 1392 bits are interleaved by writing six rows of L bits, and then reading L columns of 6-bit symbols. FIG. 11 illustrates the preferred interleaver embodiment. In the exemplary embodiment for L=56 symbols, the first 56 bits output from the convolutional encoder are written into the first row, the second 56 bits are written into the second row, and so forth until the sixth group of 56 bits are written in the sixth row. After all 56×6=336 bits are written into the interleaver, the reading operation begins. The bits are read in groups of 6 bits with each group forming a 6-bit symbol. The first symbol, or group, read is the leftmost column consisting of bits 1, 57, 113, 169, 225, and 281. The second symbol is the next column consisting of bits 2, 58, 114, 170, 226, and 282. The reading operation continues in this fashion until the last column consisting of bits 56, 112, 168, 224, 280, and 336 is read.

The 232 symbols are interleaved in three blocks: the first block has L=56 symbols, followed by L=96 symbols, and then L=80 symbols. In this embodiment, the first 56 symbols are interleaved and output to the Gold encoder 9b before the second block of 96 symbols are interleaved. Similarly, the second block of 96 symbols are interleaved before the final block of 80 symbols is interleaved.

The 6-bit symbols that are read from the interleaver output are used to initialize the g2-sequence generator 50 to the beginning of each 63-chip Gold-code sequence. The g1-sequence generator 51 is initialized to a non-zero value, such as all-ones, during the unique-word and user-data intervals. The product of the g1 and g2 sequences is used to GMSK modulate the RF carrier for transmission. The preferred BT product is 0.25, thus confining 99.9% of the power of the modulated carrier to be within a bandwidth of less than 5 MHz. The BT product is the product of the Gaussian lowpass filter bandwidth, B, and the spreading-code chip interval, T, as defined earlier.

Links from Mobile Radios to Base Stations

In the preferred embodiment, mobile radios share the three consecutive time slots that the base radio is not using. The slot duration and symbol rate of the mobile-to-base transmissions are the same as the base-to-mobile transmissions. The mobile-to-base time slots are either assigned to specific mobile radios for their exclusive use, or assigned to a group of radios for their mutually shared used. Mobile-to-base transmissions are one, two, or three slots long. In all cases, the transmission starts with a 32-symbol synchronization preamble and an 8-symbol unique word. User data, which includes addressing, CRC coding, and at least two symbols of FEC flush, is transmitted following the unique word, and its length depends upon the number of slots being used. For one-slot bursts, 40 symbols of user data are interleaved as one 40×6 bit block. For two-slot bursts, 136 symbols of user data are interleaved as a 56×6 bit block followed by an 80×6 bit block. For three-slot bursts, 232 symbols of user data are interleaved as a 56×6 bit block followed by a 96×6 bit block and then an 80×6 bit block. The user data is convolutionally encoded, interleaved, and modulated similarly to the base-to-mobile links. Following the user data, no data is transmitted for a 16-symbol guard interval.

The network architecture of FIG. 1 using link protocols, as described above, can provide the following communication services:

Simplex or half-duplex data transmission between a mobile radio and the base, another mobile radio via the base-radio relay, or another entity via the external interface at the base station.

Data multi-cast from the base station to any combination of mobile radios. The data source may be another entity that is connected to the external interface at the base station.

Data exchange, whereby any mobile or base radio in the exchange group can transmit to all other radios in the conference. The base radio may be connected to another entity via the external interface at the base station.

Simplex or half-duplex voice transmission between a mobile radio and the base, another mobile radio via the base-radio relay, or the PSTN via the external interface at the base station.

Voice conference, whereby any mobile or base radio in the conference can transmit to all other radios in the conference. The base radio may be connected to the PSTN via the external interface at the base station.

In another aspect of the network architecture of FIG. 1, the mobile radios synchronize the frequency of their respective oscillators to their respective base-stations to reduce the likelihood of introducing demodulation errors in both the base-to-mobile and mobile-to-base communication links. Traditional methods of frequency synchronization utilize the carrier signal or the modulating symbol rate. The present invention uses the rate of message bursts from the base station. In particular, the time interval between unique words (UW) transmitted from the base station is N milliseconds. Each mobile radio detects the occurrences of the unique words from the base-stations and adjusts its oscillator so that it can correctly predict the time interval between unique word detections.

Figure 12:
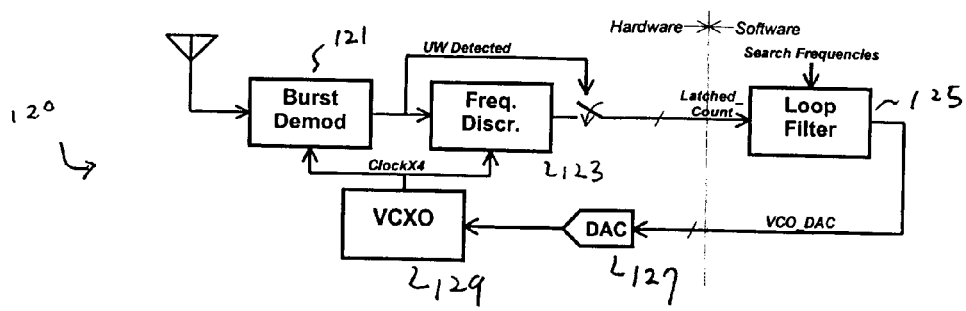
FIG. 12 shows a block diagram of a frequency synchronization circuit of the present invention.

A frequency synchronization circuit 120 of the present invention, depicted in FIG. 12, preferably includes a burst demodulator 121, a frequency discriminator 123, loop filter 125, digital-to-analog converter (DAC) 127 and a controllable oscillator 129.

Figure 10:
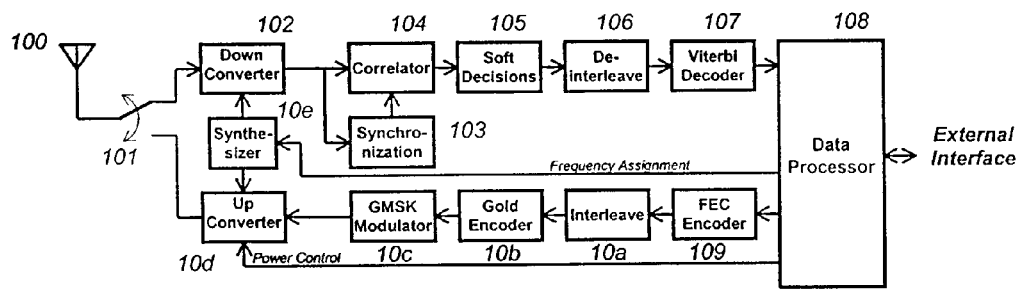
FIG. 10 is a block diagram of the base and mobile radio.

The burst demodulator 121 includes the down-converter 102, synchronization 103, and correlator 104 blocks of FIG. 10. The controllable oscillator 129 is preferably a voltage-controlled crystal oscillator (VCXO).

Figure 13:
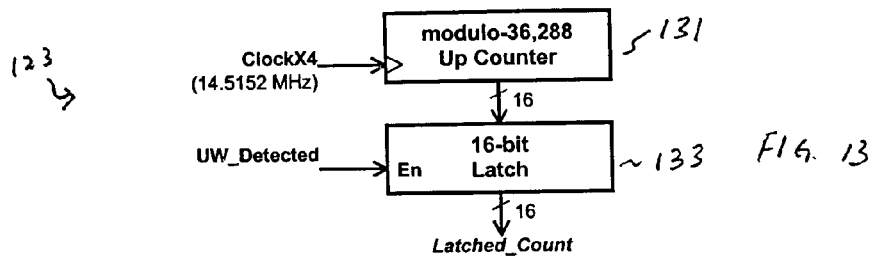
FIG. 13 shows a block diagram of a frequency discriminator of the present invention.

The frequency discriminator 123 is preferably implemented by counting clock cycles between unique words. In one exemplary embodiment, as shown in FIG. 13, the unique words (UWs) are received from the base station once every 10 milliseconds, which is exactly 4×36,288 clocks when the mobile radio clock is at the correct frequency. In order to take advantage of this feature, the frequency discriminator 123 includes a modulo-36,288 up counter 131 and a 16-bit latch 133 enabled when a UW is detected. In operation, the modulo counter 131 continuously counts while the latch 133 stores the value of the modulo counter into a memory location (or a register) "Latched_Count" each time a UW is detected. In one embodiment, the frequency of the VCXO is decreased when the Latched_Count exceeds the previous value of Latched_Count, and the frequency of the VCXO is increased when the Latched_Count less than the previous value of Latched_Count. The no change is introduced when the Latched_Count is equal to the previous value of Latched_Count. One benefit of using a modulo counter is that even if one or two UWs are failed to be detected this does not cause a major failure in frequency synchronization. For instance, if one UW is missed, when the next UW is detected, the rate of increase or decrease is simply divided by two in order to account for the missing UW.

A software routine executed by a microprocessor (or a group of semiconductor logic gates) computes the difference, $\Delta f$=Latched_Count—Previous_Latched_Count, and is positive-valued when the mobile clock is faster than the base station's clock. In this exemplary embodiment, if the mobile clock is different from the base by $\Delta f$, the change in Latched_Count between two successive unique words is $\Delta f \times 0.01$ cycles (0.01 represents the 10 milliseconds interval between UWs).

The software loop filter 125 operates in two different modes: an acquisition/re-acquisition mode during which the frequency of the base oscillator is searched; and normal operation during which the frequency of the base oscillator is tracked.

For the search of the frequency of the base oscillator, the search aperture to search the frequency preferably covers the total range of frequency error due to temperature and/or aging oscillator errors. In addition, the frequency step size is preferably small enough to guarantee that at least one unique word will be detected. Either of two different search strategies may be used. The simplest example is a simple incremental search that rolls over from $F_{Aperture}/2$ to $-F_{Aperture}/2$. A better strategy is to increment by one step, decrement by two steps, increment by three steps, and so on until the entire range is tested. The software outputs a number to the DAC to generate a control voltage for the VCXO.

Figure 14:
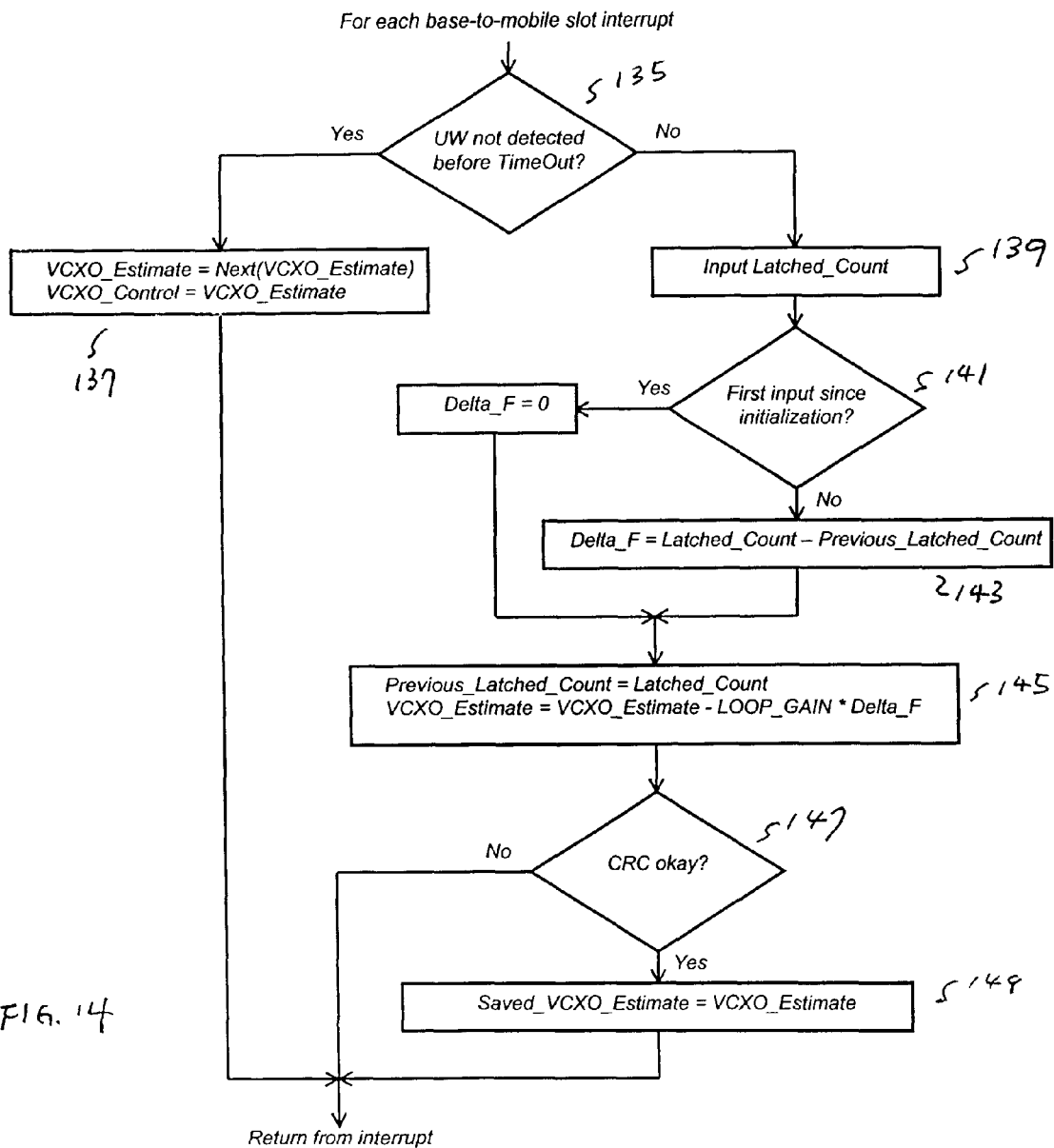
FIG. 14 shows a flow chart of a loop filter of the present invention.

The more detailed operation of the loop filter is illustrated in FIG. 14. In step 135, UW is sought for each base-tomobile slot interrupt for a predetermined length of a "TimeOut." The length of a "TimeOut" is preferably between 3–5 UWs. If UW is not detected, the loop filter operates in the acquisition/re-acquisition mode. In this mode of operation, the VCXO is set to Next(VCXO_Estimate) which computes the next "search frequency," VCXO_Control is set to VCXO_Estimate and process is returned from the interrupt. (Step 137.)

If UW is detected, the loop filter operates in the normal mode. In this mode, Latched_Count value is received from the frequency discriminator. (Step 139) In step 141, whether the input is the first input since the initialization or not is determined. If it is the first, Delta_F is set to zero. If it is not, Delta_F is set to Latched _Count—Previous_Latched_Count. (Step 143) Following the above steps, Previous_Latched_Count is set to Latched_Count and VCXO_Estimate is set to VCXO_Estimate—LOOP_GAIN*Delta_F. (Step 145) Further, in step 147, an error checking function is executed. If there is an error, the process is returned from the interrupt. If there is no error, then Saved_VCXO_Estimate is set to VCXO_Estimate. (Step 149) The Saved_VCXO_Estimate is used when there is a loss-of-synchronization or power shut-down.

It should be noted that the above described synchronization scheme can be utilized in any radio signal communication system.

Figure 15:
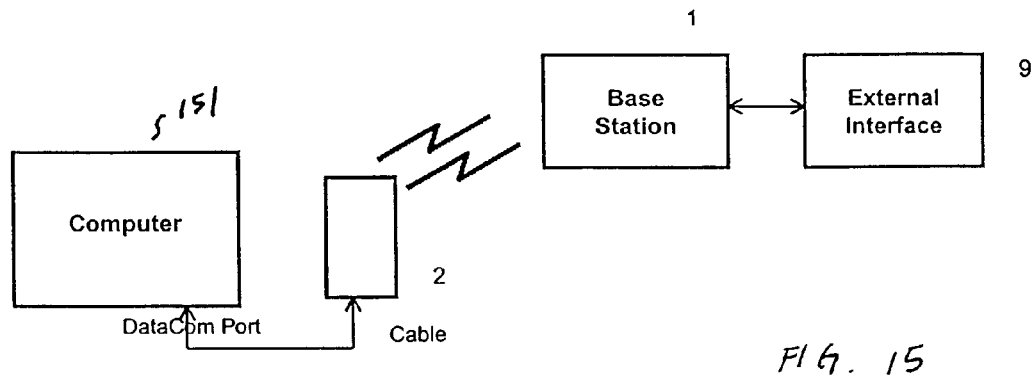
FIG. 15 shows a system in which a computer is connected to a mobile radio of the present invention.

Referring back to FIG. 11, the data processor 108 also digitizes voice and formats Internet communication packets into similar digital data streams so that either can be transmitted and received by the transceiver. This aspect of the present invention is utilized in a voice/Internet dual communication system illustrated in FIG. 15. In particular, the voice/Internet dual system includes a computer 151 configured to receive and send Internet communication packets. In turn, the computer is connected to the mobile radio 2 which can establish a communication link with the base station 1. The mobile radio 2 and the base station 1 are implemented as discussed above. The external interfaces 9, discussed in connection with FIG. 1, can be a phone jack for providing the Internet connection to the base station 1.

From a user's perspective, the voice/Internet dual system operates similarly to a conventional mobile phone except that it offers the additional capability of handling both voice and binary data, e.g., Internet communication packets.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, whose scope is defined by the following claims.

What is claimed is:

1. A receiver configured to receive a radio signal from a base-station, the radio signal transmitted at a base-station frequency and includes unique words transmitted at a regular interval, the receiver comprising:

a frequency discriminator comprising:

a counter configured to modulo count a predetermined number; and a storage device, wherein the storage device is configured to store an output of the modulo counter when a unique word is received;

an oscillator configured to generate a signal having an estimated frequency; and a loop filter configured to receive the stored value of the storage device and configured to adjust the estimated frequency based on the received stored value of the storage device, to thereby set the estimated frequency to be substantially equal to the base-station frequency.

2. The receiver according to claim 1 wherein the regular interval is substantially equal to 10 milliseconds.

3. The receiver according to claim 1 wherein the loop filter is further configured to store a previously received stored value and configured to adjust the estimated frequency based on the previously received stored value and the received stored value of the storage device.

4. The receiver according to claim 3 wherein the loop filter is further configured to increase the estimated frequency when the received stored value is less than the previously received stored value.

5. The receiver according to claim 3 wherein the loop filter is further configured to the decrease the estimated frequency when the received stored value is more than the previously received stored value.

6. The receiver according to claim 1 wherein the loop filter is further configured to search for the base-station frequency during an acquisition period.

7. A method of receiving a radio signal from a base-station, the radio signal transmitted at a base-station frequency and includes unique words transmitted at a regular interval, the method comprising:

modulo counting a predetermined number;

storing an output of the modulo counter to a storage device when a unique word is received;

generating a signal having an estimated frequency;

receiving the stored value of the storage device; and adjusting the estimated frequency based on the received stored value of the storage device, to thereby set the estimated frequency to be substantially equal to the base-station frequency.

8. The method according to claim 7 wherein the regular interval is substantially equal to 10 milliseconds.

9. The method according to claim 7 further comprising:

storing a previously received stored value; and adjusting the estimated frequency based on the previously received stored value and the received stored value.

10. The method according to claim 9 further comprising:

increasing the estimated frequency when the received stored value is less than the previously received stored value.

11. The method according to claim 9 further comprising:

decreasing the estimated frequency when the received stored value is more than the previously received stored value.

12. The method according to claim 7 further comprising:

searching for the base-station frequency during an acquisition period.

\* \* \* \* \*